Aug. 21, 1928.  
A. J. MAAS  
1,681,300  
SCREEN MEANS FOR AUTOMOBILES  
Filed Feb. 12, 1927 2 Sheets-Sheet 1

Inventor  
A. J. Maas,  
By *Clarence A. O'Brien*  
Attorney

Aug. 21, 1928.
A. J. MAAS
1,681,300
SCREEN MEANS FOR AUTOMOBILES
Filed Feb. 12, 1927   2 Sheets-Sheet 2
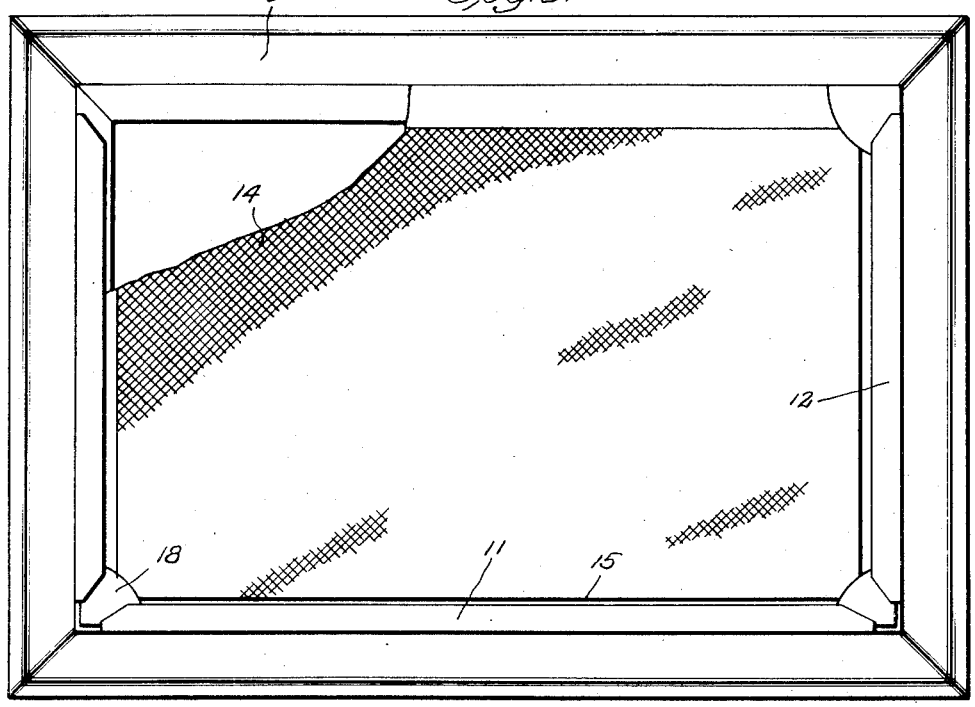
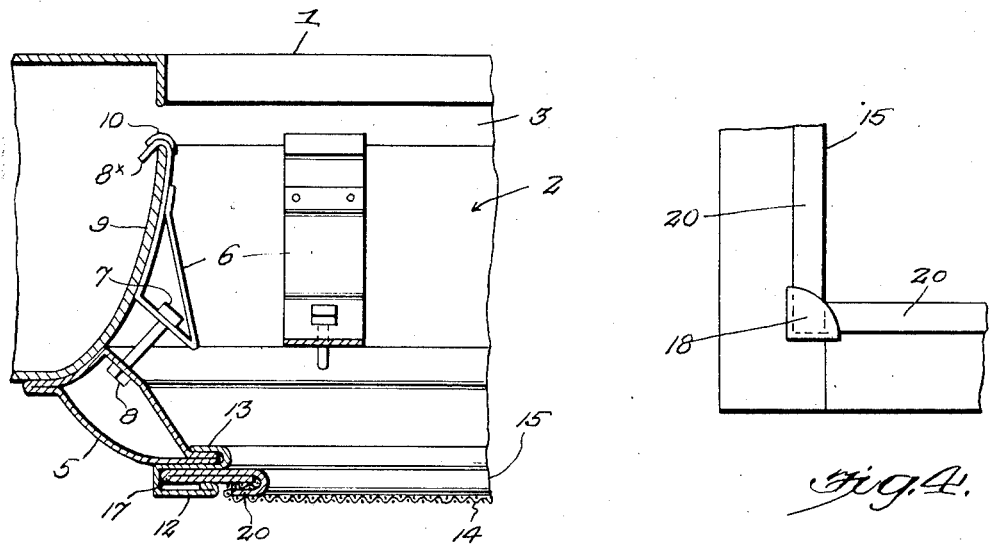
Inventor
A. J. Maas,
By Clarence A. O'Brien
Attorney Patented Aug. 21, 1928.

1,681,300

UNITED STATES PATENT OFFICE.

ARTHUR J. MAAS, OF MADISON, WISCONSIN.

SCREEN MEANS FOR AUTOMOBILES.

Application filed February 12, 1927. Serial No. 167,767.

The object of my present invention is the provision of quickly and easily applied means for efficiently screening openings in automobile doors and the like.

To the attainment of the foregoing, the invention consists in the improvement as hereinafter described and definitely claimed.

In the accompanying drawing, forming part of this specification:—

Figure 2 is an enlarged detail section taken on the plane indicated by the line 2—2 of Figure 1, looking downwardly.

Figure 3 is a front elevation of my novel screen means with the wire screen partly broken away.

Figure 4 is an elevation illustrating one corner of the frame for carrying the screen comprised in my improvement.

Similar numerals of reference designate corresponding parts in all the views of the drawings.

Figure 1:
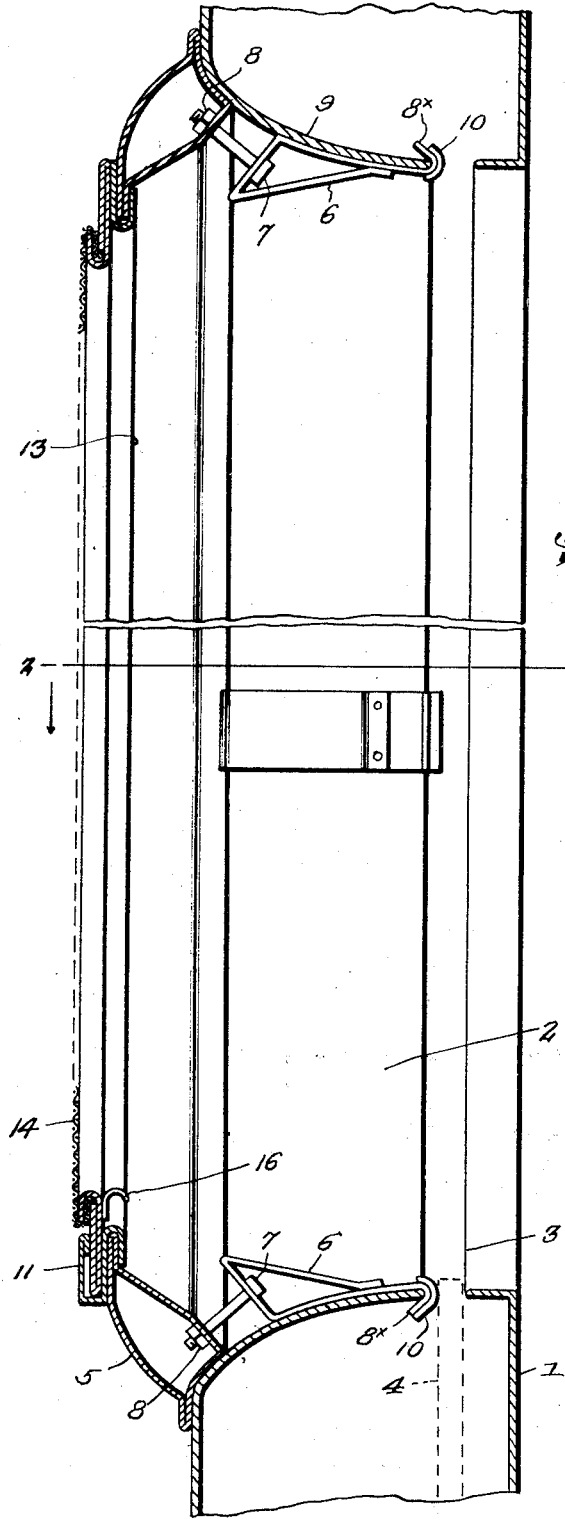
Figure 1 is a fragmentary vertical section illustrating an automobile door with an opening therein, and also illustrating the application of my improvement to the door so as to screen said opening with a view to barring insects during movement of the automobile, and also when the same is used for sleeping purposes.

I show in Figures 1 and 2 the portions of a door complementary to an automobile body, the said door being numbered 1, and being provided with an opening 2, and being also provided with a way 3 for a pane of glass 4, the said pane of glass 4 being shown by dotted lines in Figure 1 and being designed to be raised from its lower position shown by dotted lines to its raised position in which latter position it is calculated to close the opening 2 in conventional manner.

My novel screen means comprises a main frame 5, preferably of sheet metal and hollow in form. The said main frame 5 is shaped as illustrated to rest against the wall of the opening 2 and also against the outer side of the door 1, and for the connection of the main frame 5 to the door 1 I provide a plurality of fasteners at the upper and lower ends and also at the sides of the opening 2. Each of the said fasteners comprises a bracket 6 and a bolt 7 equipped with a nut 8 and serving for the connection of the bracket to the main frame 5 after the manner shown in Figures 1 and 2. Each of the brackets 6 terminates at its inner end in a hook $8^x$, designed to straddle the inner edge of the opening wall 9, and it will also be noted that the hook $8^x$ is padded as designated by 10 so as to avoid scratching or otherwise injuring the pane of glass 4 when the latter is moved to or from its closed position. It will be manifest from Figure 1 that the plurality of fasteners relatively arranged as defined will not interfere with the opening and closing of the pane of glass 4.

Figure 6:
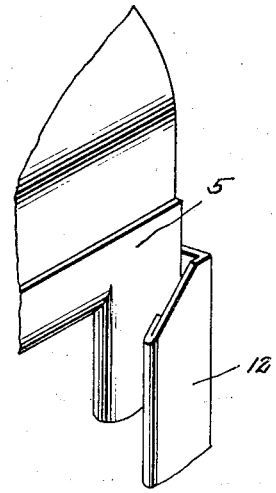
Figure 6 is a detail perspective showing a portion of the main frame of my novel screening means.

The main frame 5 is provided with a holder for a screen frame hereinafter described in detail, the said holder including a lower channel bar 11, Figures 1 and 3, and side channel bars 12, the said side channel bars 12 being open at their upper ends so as to permit of the screen being moved downwardly into and moved upwardly out of the holder formed by the bars 11 and 12. One of the side bars 12 of the screen frame holder is shown in Figure 6, and from said Figure 6 the relative arrangement of the side bar 12 to the main frame 5 will be readily appreciated.

The holder formed by the bars 11 and 12 is of sheet metal in the embodiment illustrated, and it will be noted from Figures 1 and 2 that each of the bars 11 and 12 is crimped or clamped over a portion of the main frame 5, each bar 11 and 12 being provided at its inner side with a U-shaped portion 13 to receive a reduced inner edge portion of the main frame 5.

Figure 5:
Figure 5 is a detail section showing the relative arrangement of the corner cover shown in elevation in Figure 4.

The frame carrying the wire screen 14 is designated by 15, and the said frame 15 is shown in Figure 1 as equipped with a finger piece 16 through the medium of which the screen may be readily raised by a person within the automobile. I would also have it understood that the finger piece 16 is preferably secured in detachable manner to the frame 15, this in order that the frame 15 carrying the screen 14 may be lifted out of the holder bars 11 and 12 when deemed expedient after the finger piece 16 is detached. The frame 15 is formed of sheet metal in the cross sectional shape illustrated, the double thickness portion 17 of the frame 15 being designed to rest in the holder formed by the bars 11 and 12. I show in Figures 4 and 5 a metal corner cover 18, and it is manifest that when the frame 15 comprises end bars and upper and lower bars, four of the corner covers 18 will be employed. As will be readily appreciated from Figures 4 and 5, the corner cover 18 illustrated is formed of sheet metal and is provided with flanges 19 to engage portions 20 of the frame 15.

As will be readily understood from Figures 1, 2 and 3, the edge portions of the wire screen 14 are bent over the portions 20 of the frame 15 and are clamped or otherwise secured between the said portions 20 and the opposed portions of the frame 15. From this it follows that the screen made up of the frame 15 and the member 14 of appropriate reticulated material is susceptible of being conveniently handled as a unit.

It will be apparent from the foregoing that my novel screen means considered as a whole is adapted to be expeditiously and easily applied to an automobile door, and this without the employment of skilled labor; also that when my improvement is applied as illustrated in Figures 1, 2 and 3, insects will be precluded from entering the automobile through the opening 2. It will also be appreciated that when desired, the screen including the frame 15 and the reticulated material 14 may be conveniently raised to a greater or less extent, and that when occasion demands, the screen may be entirely separated from the frame 5 and stored away for future use.

It will also be appreciated from the foregoing that when properly embellished, my improvement is calculated to enhance, rather than detract from the finished appearance of an automobile body.

While I have shown my improvement as applied to a door of an automobile, it is to be understood that within the purview of my invention my novel screen means may be employed to guard any opening in an automobile body.

I have entered into a detailed description of the construction and relative arrangement of parts embraced in the present and preferred embodiment of my invention in order to impart a full, clear, and exact understanding of the said embodiment. I do not desire, however, to be understood as limiting myself to the construction illustrated, my invention being defined by my appended claim within the scope of which modifications may be made without departure from my invention.

Having thus described the invention, what I claim is:—

Means for screening an opening in an automobile body, comprising a main frame arranged to bear against an automobile body about an opening therein, and extending inwardly from the wall of the opening and having an inner reduced edge portion, a screen holder disposed at the outer side of the main frame and made up of a lower channel bar and side channel bars, the side channel bars being open at their upper ends, and all of said bars being provided with portions of U-shape in cross section, crimped over the said inner reduced edge portion of the main frame, and a screen disposed and retained in the said channel bars on the main frame.

In testimony whereof I affix my signature.

ARTHUR J. MAAS.